UNITED STATES PATENT OFFICE 2,050,927

PROCESS FOR BREAKING PETROLEUM EMULSIONS

Melvin De Groote, St. Louis, Mo., assignor to Tretolite Company, Webster Groves, Mo., a corporation of Missouri No Drawing. Application December 21, 1935
Serial No. 55,614
4 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings."

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent used in my process consists of a chemical compound characterized by the presence of both an oxy-hendecenoic acid residue and an oxy-octadecadiene acid residue in the same molecule.

In U. S. Letters Patent to Melvin De Groote and Bernhard Keiser, No. 2,023,996, dated December 10, 1935, there is described a process for breaking petroleum emulsions by means of oxy-hendecenoic acid materials. As stated in said patent, hendecenoic acid is an unsaturated acid similar to certain fatty acids, but apparently not occurring naturally in any fat or oil. It is a lower homologue of oleic acid and is obtained by distilling ricinoleic acid or the glyceride thereof (castor oil) under diminished or atmospheric pressure. It is sometimes known as undecylenic acid. Its formation from ricinoleic acid, for example, is indicated by the following reaction:

In preparing the treating agent or demulsifying agent employed in the present process, it is not necessary that the hendecenoic acid, which is employed as a raw material, be absolutely pure, but it may be of a technical quality so as to contain some unconverted castor oil and certain products of decomposition other than hendecenoic acid. It may contain some oenanthol (heptoic aldehyde). This aldehyde can be removed by blowing an inert gas through the commercial hendecenoic acid at a relatively low temperature.

Oxy-hendecenoic acid bodies are derived from hendecenoic acid of technical purity in various manners, such as those outlined in the aforementioned De Groote and Keiser patent. One method employed is to form the fatty sulfates with subsequent hydrolysis. Another method is dependent upon oxidation or hydroxylation under certain controlled conditions. For example, hendecenoic acid of technical purity may be subjected to air oxidation by any of the methods conventionally employed for oxidation of castor oil and the like. My preference is to oxidize hendecenoic acid at relatively low temperature by means of moist air under pressure. I prefer to use a temperature of 125° to 135° C., and to use approximately 45 to 75 lbs, gauge pressure. If desired, hendecenoic acid may be oxidized at a higher temperature by means of air or oxygen at atmospheric pressure.

I have referred to the product obtained by oxidizing hendecenoic acid as "oxy-hendecenoic acid." The expression "oxy-hendecenoic acid" is intended to refer to the derivatives in which additional oxygen has been introduced into the molecules. For instance, this may be in the manner indicated by the formula $C_{11}H_{20}O_3$. This represents the saturation of the ethylene linkage by means of an atom of oxygen. It is believed that oxidation, especially with moist air, results in the conversion of this added oxygen atom into two hydroxyl radicals, so that ultimately one apparently obtains dihydroxyhendecatoic acid, as indicated by the formula $C_{11}H_{20}(OH)_2O_2$. In other words, the addition product of hendecenoic acid is the substitution product, at least hypothetically, of hendecatoic acid.

As further stated in said De Groote and Keiser patent, it is immaterial whether there be introduced an oxygen atom or two hydroxyl radicals in the hendecenoic acid body to produce the oxy-hendecenoic acid body. It is obvious, of course, where a hydroxyl is formed, that one has a hydroxylated fatty acid or hydroxylated fatty acid compound, and that the fatty acid at least may act either as an alcohol or as an acid in the same sense that ricinoleic acid, for example, may act as an alcohol or acid.

In another U. S. Letters Patent to said Melvin De Groote and Bernhard Keiser, No. 2,023,997, dated December 10, 1935, there is described a process for breaking emulsions by means of oxy-octadecadiene acid bodies. As stated in said last mentioned patent, octadecadiene acid is a material of the following formula:

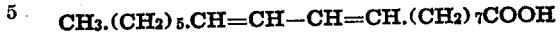
$CH_3.(CH_2)_5.CH=CH-CH=CH.(CH_2)_7COOH$

It is commonly referred to as octadecadiene-9,11-acid-1. This is the particular isomer derived from castor oil or ricinoleic acid, and hereinafter the expression "octadecadiene acid" will refer to this particular acid, insofar that it is the one which is commercially available.

As stated in U. S. Patent No. 1,920,585, to Ott and Schussler, dated August 1, 1933, it is obtainable by splitting off water from ricinoleic acid $(C_{18}H_{34}O_3)$ of the formula:

$HCH_3.(CH_2)_5.CH.(OH).CH_2.CH=CH.(CH_2)_7COOH$

Octadecadiene-9,11-acid-1 of suitable purity may be subjected to oxidation by any of the methods conventionally employed for oxidation of castor oil and the like. My preference is to oxidize octadecadiene-9,11-acid-1 at a relatively low temperature by means of moist air under pressure. I prefer to use a temperature of 125° to 135° C., and to use approximately 45 to 75 lbs. gauge pressure. If desired, octadecadiene-9,11-acid-1 may be oxidized at a higher temperature by means of air or oxygen at atmospheric pressure. Furthermore, it may be oxidized in the presence of an inert material, if more convenient to reduce the viscosity during oxidation by means of such added material.

I have referred to the product obtained by oxidizing octadecadiene-acid as "oxy-octadecadiene acid". The expression "oxy-octadecadiene acid" is intended to refer to the derivatives in which additional oxygen has been introduced into the molecule, for instance, as indicated by the formula $C_{18}H_{32}O_3$. This represents the saturation of an ethylene linkage, or perhaps, the partial saturation of two ethylene linkages, or the formation of a new ethylene linkage by means of an added oxygen atom. I do not know exactly the composition of the product obtained by the initial oxidation of octadecadiene acid. The reaction or reactions presumably are comparable to the saturation of conjugated double bonds by halogens or similar reagents. Under such circumstances a new ethylene linkage may be created. See "Textbook of Organic Chemistry", by Bernthsen, 1931 edition, page 840. It is believed that oxidation, especially with moist air, results in the conversion of this added oxygen into two hydroxyl radicals, so that one ultimately obtains hydroxylated octadecadiene acid, as indicated by the formula $C_{18}H_{32}(OH)_2O_2$. In other words, the addition product of octadecadiene acid is the substitution product, at least hypothetically, of the corresponding semi-saturated acid of the composition $C_{18}H_{34}O_2$, i. e., apparently dihydroxy-iso-oleic acid. Complete hydroxylation would apparently form tetrahydroxystearic acid.

As further stated in the De Groote and Keiser Patent No. 2,023,997, it is immaterial whether an oxygen atom is introduced or two hydroxyl radicals are introduced into the octadecadiene acid to produce the oxy-octadecadiene acid body. It is obvious, of course, where a hydroxyl is formed, that one has a hydroxylated fatty acid or hydroxylated fatty acid compound, and that the fatty acid at least may act either as an alcohol or as an acid, in the same sense that ricinoleic acid may act as an alcohol or acid.

The present process, as differentiated from the processes of said two previously mentioned De Groote and Keiser patents, is characterized by the fact that I employ a demulsifying agent of a kind in which there is present both an oxy-hendecenoic acid residue and an oxy-octadecadiene-acid residue in the same molecule. The formation of such materials is relatively simple. Since these materials may represent the acid alcohol type of reagent in the same sense that ricinoleic acid is an acid alcohol, one may obtain the same reaction from one molecule of oxy-hendecenoic acid and one molecule of oxy-octadecadiene acid, as one would obtain from two molecules of ricinoleic acid. Thus, one may form a new acid having a single carboxyl radical, or one might form an ether type acid, in which there are available two acid carboxyls, as in the case of dibasic diricinoleic acid. Needless to say, just as one can form triricinoleic acid, likewise, one can combine two molecules of oxy-hendecenoic acid with one molecule of oxy-octadecadiene acid, or one can combine two molecules of oxy-octadecadiene acid with one molecule of oxy-hendecenoic acid. Likewise, any other alcohol acid type of material, such as ricinoleic acid, hydroxystearic acid, or the condensation product of ethylene glycol with phthalic acid, or with oxalic acid, or with maleic acid, may serve as a bridge or connecting link by combination with a molecule of oxy-hendecenoic acid and a molecule of oxy-octadecadiene acid. Such material which is to be used as a connecting link or bridge, of course, must be amphoteric if it can be employed to combine with a hydroxyl radical of one oxy acid and a carboxyl radical of the other oxy acid. Obviously, where it combines with a hydroxyl of an oxy acid, one may use an oxy acid material in which there is no free carboxyl, such as a salt or an ester.

Other means of combination are readily available, such as the formation of a diglyceride, in which a molecule of oxy-hendecenoic acid and a molecule of oxy-octadecadiene acid is united with a molecule of glycerol. Likewise, two molecules of oxy-hendecenoic acid and one molecule of oxy-octadecadiene acid and one molecule of oxy-hendecenoic acid combine with one molecule of glycerol to give a mixed triglyceride. One molecule of oxy-octadecadiene acid and one molecule of oxy-hendecenoic acid can be united by means of ethylene glycol or some similar glycol.

As previously stated, where either oxy acid is acting by virtue of its alcoholic hydroxy, that is, acting as an alcohol, one need not employ the acid itself, but one may employ any suitable salt, such as a sodium salt, ammonium salt, potassium salt, or an amine salt, such as a triethanolamine salt, etc. Where the oxy acid is acting by virtue of its carboxylic hydrogen, one need not use the acid itself, but one might employ a combination wherein the alcoholic hydroxyl had already combined with some other acid, such as ricinoleic acid. All these reactions are essentially esterification, with the exception of the formation of the ether type. In this instance, one may employ both materials free from an acidic hydrogen. The esterification reactions are best promoted at a fairly high temperature, and preferably, slightly above the boiling point of water. The passing of dry hydrochloric acid gas hastens the reaction. The ether type of compounds are generally produced at still higher temperature, or as a result of hydrolysis after sulfonation. Any conventional means may be employed to promote these reactions.

As a matter of simplicity, it is easier to make a mixture of the unoxidized hendecenoic acid and the unoxidized octadecadiene acid and subject the mixture to mild oxidation in presence of moist air, and thus produce the oxy acids of both materials in presence of each other. Under such conditions, the presence of moisture in the air apparently does not prevent esterification from taking place simultaneously, and thus the oxidation and esterification reaction can be so conducted in one operation, as to yield a material which is relatively high in the percentage of condensed type material or polymolecular type material, which is characterized by the presence of an oxy-octadecadiene acid residue and an oxy-hendecenoic acid residue in the same molecule.

I prefer to prepare the reagent or demulsifying agent used in my process in the following manner:

218 lbs. of hendecenoic acid of technical purity are mixed with 280 lbs. of octadecadiene acid of technical purity (or in the case of one material but not both, one may employ the proper amount of the glyceride) and subjected to mild oxidation at a relatively low temperature and under pressure. I prefer to use a temperature of 125-135° C. and to use approximately 45 to 75 lbs. gauge pressure. The air used for oxidation should contain its normal moisture content. Such operation is continued until oxidation or hydroxylation is completed, as characterized by no further drop in the iodine number, or by any other suitable index. After such oxidation or hydroxylation reaction is completed, the temperature is maintained at approximately 125° until there is no further indication of water still being formed. If desired, dry air, dry hydrocyloric acid gas, or dry carbonic acid gas may be passed through the mass to complete the final esterification reaction. The product thus obtained is suitable for use as the demulsifying agent in my present process, especially after dilution of some suitable solvent, so as to reduce its viscosity. One or more of the following will serve as a suitable solvent: Benzol, solvent naphtha, kerosene, or propyl alcohol.

If desired, one may subject the mixture of hendecenoic acid and octadecadiene acid to sulfation and then follow this step by hydrolysis, so as to yield the oxy acids which can then be subjected to dehydration, so as to form materials of substantially the same kind or same nature as obtained by the air oxidation-esterification procedure, except for the possible presence of considerable ether type material.

If desired, any free acidity which is present in the preferred reagent may be neutralized by triethanolamine or by any other suitable amine, such as monoamylamine, benzylamine, etc. The free acidic carboxyl may be converted into a salt, such as a sodium, potassium, or ammonium salt. The free acidic carboxyl, of course, may be combined with an alcohol, such as ethyl, methyl, or propyl alcohol, or with glycerol.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc. may be employed as diluents. Miscellaneous solvents, such as pine oil, carbon tetrachloride, sulfur dioxide extract obtained in the refining of petroleum, etc. may be employed as diluents. Similarly, the material or materials employed as the demulsifying agent of my process may be admixed with one or more of the solvents customarily used in connecticon with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000, or 1 to 20,000, or 1 to 30,000, such an apparent insolubility in oil and water is not significant, because said reagents undoubtedly have solubility within the concentration employed. This same fact is true in regard to the material or materials employed as the demulsifying agent of my process.

In practising my invention, a treating agent or demulsifying agent of the kind above described is brought into contact with or caused to act upon the emulsion to be treated, in any of the various ways or by any of the various apparatus now generally used to resolve or break petroleum emulsions with a chemical reagent.

Having thus described my invention, what I claim as new and desire to secure by Letters Patent is:

1. A process for breaking petroleum emulsions of the water-in-oil type, which consists in subjecting the emulsion to the action of a demulsifying agent comprising a chemical compound characterized by the presence of both an oxy-hendecenoic acid residue and an oxy-octadecadiene acid residue in the same molecule.

2. A process for breaking petroleum emulsions of the water-in-oil type, which consists in subjecting the emulsion to the action of a demulsifying agent comprising a chemical compound in the form of a salt, characterized by the presence of both an oxy-hendecenoic acid residue and an oxy-octadecadiene acid residue in the same molecule.

3. A process for breaking petroleum emulsions of the water-in-oil type, which consists in subjecting the emulsion to the action of a demulsifying agent comprising a chemical compound in the form of an acid, characterized by the presence of both an oxy-hendecenoic acid residue and an oxy-octadecadiene acid residue in the same molecule.

4. A process for breaking petroleum emulsions of the water-in-oil type, which consists in subjecting the emulsion to the action of a demulsifying agent comprising a chemical compound in the form of an ester, characterized by the presence of both an oxy-hendecenoic acid residue and an oxy-octadecadiene acid residue in the same molecule.

MELVIN DE GROOTE.

Certificate of Correction

Patent No. 2,050,927.     August 11, 1936.

MELVIN DE GROOTE

It is hereby certified that error appears in the printed specification of the above numbered patent requiring correction as follows: Page 2, first column, line 17–18, for "HCH$_3$" at the beginning of the formula read $CH_3$; and that the said Letters Patent should be read with this correction therein that the same may conform to the record of the case in the Patent Office.

Signed and sealed this 27th day of October, A. D. 1936.

[SEAL]

HENRY VAN ARSDALE,
*Acting Commissioner of Patents.*